July 4, 1967   G. F. G. CLOUGH ETAL   3,329,407
AERATION
Filed Feb. 19, 1965   2 Sheets-Sheet 1
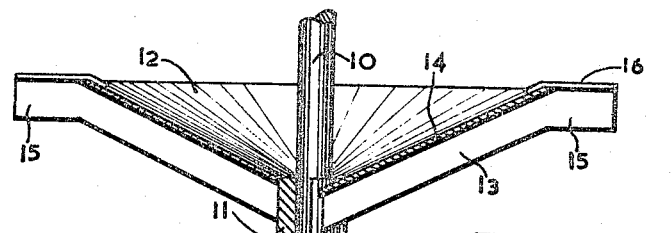
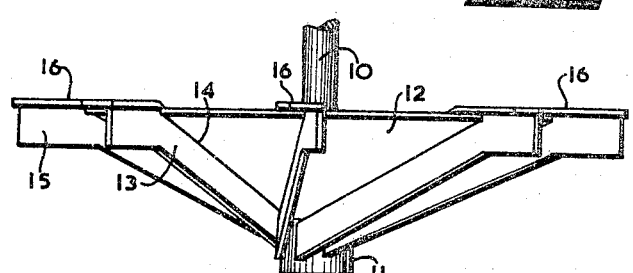
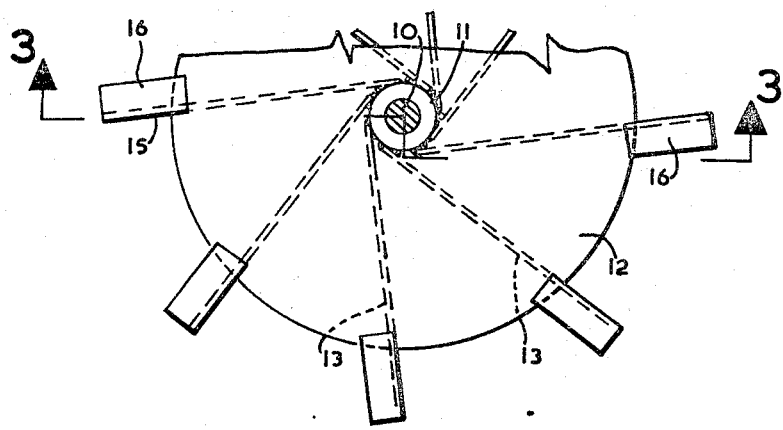
INVENTORS
GEORGE F. G. CLOUGH
WALTER J. WILTSHIER
By Norris + Bateman, Attys July 4, 1967 G. F. G. CLOUGH ETAL 3,329,407
AERATION
Filed Feb. 19, 1965 2 Sheets-Sheet 2
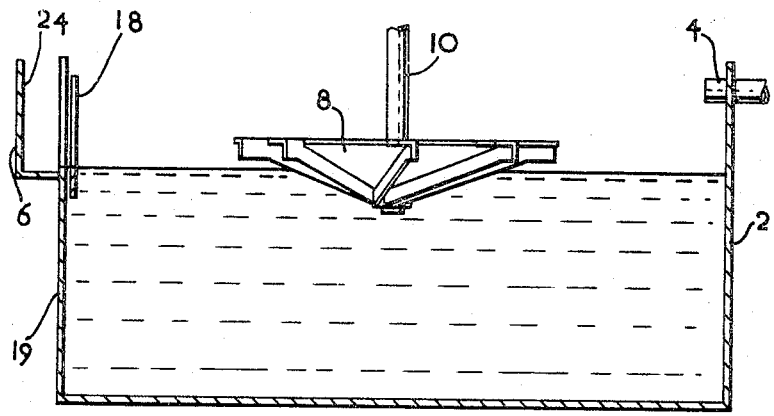
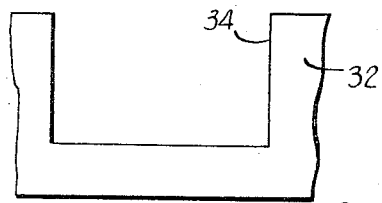
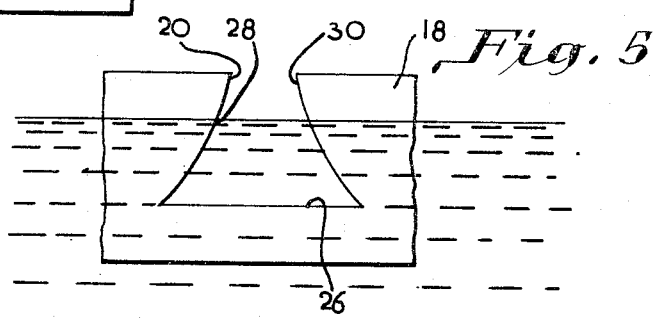
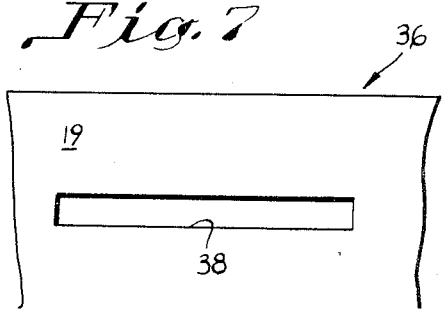
INVENTORS
GEORGE F. G. CLOUGH
WALTER J. WILTSHIER
By Norris & Bateman, Attys 3,329,407
AERATION
George F. G. Clough, Adlington, Macclesfield, and Walter James Wiltshier, Cheadle Hulme, England, assignors to Simon-Carves Limited, Stockport, England, a British company
Filed Feb. 19, 1965, Ser. No. 433,897
Claims priority, application Great Britain, Mar. 7, 1964, 9,818/64
9 Claims. (Cl. 259—8)

This invention is concerned with improvements in or relating to aeration.

At times in industrial processes it is required to aerate liquids. For example in processes of treating industrial effluents for disposal, aeration is frequently an important step in the process; this is the case in the treatment of industrial effluents by aerobic bacteria.

It is an object of the invention to provide an improved liquid aeration apparatus.

Liquid aeration apparatus is described hereinafter by way of example with reference to the drawings; this apparatus comprises (a) a container through which liquid flows in the operation of the apparatus, (b) an aerator member mounted in the container and adapted to vary the oxygen transfer rate to the liquid in accordance with the level of the liquid in the container, and (c) means for so varying the level of the liquid in the container in accordance with the flow rate of liquid therethrough that in a normal working range the ratio of the oxygen transfer rate to the liquid flow rate is substantially constant.

It will be realised that the lower the liquid flow rate the lower the necessary oxygen transfer rate.

There now follows a description, to be read with reference to the drawings, of the apparatus embodying the invention. This description is given by way of example of the invention only and not by way of limitation thereof.

In the drawings:

FIGURE 1 shows a plan view of an aerator member of the apparatus;

FIGURE 2 shows a side view of the aerator member;

FIGURE 3 shows a section on the line 3—3 of FIGURE 1;

FIGURE 4 shows a diagrammatic view of the apparatus;

FIGURE 5 shows a front view of weir means of the apparatus;

FIGURE 6 shows a front view of modified weir means; and

FIGURE 7 shows a front view of further modified weir means.

The apparatus comprises a liquid container 2 (FIGURE 4) having an inlet 4 and an outlet 6. In the operation of the apparatus liquid effluent for example, sewage, flows continuously through the container from the inlet 4 to the outlet 6 and is treated with aerobic bacteria in the container. The apparatus also comprises an aerator member 8 which is rotatable in the container 2 about a vertical axis to aerate the liquid effluent.

The aerator member 8 (FIGURES 1, 2 and 3) corresponds generally in construction and arrangement with the aerator member described in our United Kingdom patent specification No. 919,467 to which reference may be made. The member 8 is mounted for rotation on a vertical shaft 10 and comprises an inverted symmetrical frusto-conical shell 12 coaxial with the shaft 10, a circular cylindrical boss 11 of small diameter secured to, and extending downwardly from, the shell 12 coaxially therewith, the shaft 10 being secured in the boss 11, and a plurality of arms 13 each of which lies in a vertical plane and is secured to the boss 11 extending tangentially to the boss 11 along the lower surface of the shell 12. Each arm 13 has an end portion 15 extending outwardly from the outer periphery of the shell 12. Each end portion 15 has a horizontal upper edge co-planar with the outer periphery of the shell 12, and has a horizontal plate 16 which extends circumferentially from the edge on the side of the arm 13 remote from the boss 11, and outwardly from the outer periphery of the shell. In the operation of the apparatus the member 8 is rotated at constant angular velocity in the sense in which the plates 16 extend circumferentially from the arms 13.

The liquid level in the container 2 varies in the operation of the apparatus according to the flow rate of liquid therethrough, and at the highest liquid level the plates 16 are substantially level with the surface of the liquid or just immersed therein. The member 8 remains at the same height relative to the container 2 and under this condition the oxygen transfer rate of the member 8 at constant angular velocity can be represented over a range by the equation $$T = a - bx \quad (1)$$

where

T is the oxygen transfer rate (e.g. moles $O_2$ per hour);
$x$ is the distance from the lower surfaces of the plates 16 to the liquid surface when the member 8 is stationary; and
$a$ and $b$ are constants dependent on the size of the member 8 and the angular velocity of the member 8.

The outlet 6 of the container 2 comprises a vertical weir plate 18 (FIGURES 4 and 5) provided in a side wall 19 of the container 2 comprising a weir notch 20 through which the liquid flows out of the container 2. The outlet 6 also comprises a conduit 24 through which the liquid flows after passing through the notch 20.

The notch 20 is adapted to vary the level of the liquid in the container 2 in accordance with the flow rate of the liquid therethrough so that in a normal working range the ratio of the oxygen transfer rate to the liquid in the container 2 to the volumetric flow rate of liquid through the container 2 is substantially constant at constant angular velocity of the member 8 i.e.

$$\frac{T}{Q} = a \text{ constant} \quad (2)$$

where Q is the liquid flow rate.

At zero flow rate the member 8 remains immersed sufficiently to maintain agitation of the liquid for example to keep sludge in suspension and, as an incidental result, there is a finite oxygen transfer rate at zero flow rate; thus the ratio $T/Q$ is constant only above a certain oxygen transfer rate.

The power consumed by the aerator member 8 varies with the distance $(x)$ between the liquid surface and the lower surfaces of the plates 16. Thus in the operation of the apparatus the required aeration is obtained while the liquid flow rate varies, without excessive power consumption, and the risk of excessive aeration is rendered small.

The notch 20 is symmetrical and comprises a horizontal base 26 and curved sides 28, 30 which slope upwardly from the base 26 towards each other.

The apparatus may be modified in various ways. For example the weir plate 18 may be replaced by a weir plate 32 (FIGURE 6) having a horizontal elongated rectangular notch 34, or by weir means 36 (FIGURE 7) comprising a horizontally elongated rectangular notch 38 provided in the side wall of the container, the notch 38 being submerged when liquid is flowing through the container.

We claim:

1. Liquid aeration apparatus comprising (a) a container having an inlet and an outlet adapted for continuous flow of liquid through the container, (b) aeration means mounted in the container for varying the oxygen transfer rate to the liquid in accordance with the extent of its immersion in said liquid, and (c) a weir at said outlet for controlling the discharge of liquid from said container, said weir having a relatively wide bottom and sides converging towards the upper end of the weir for varying the level of said liquid within the container in accordance with the flow rate of the liquid through said container to maintain the ratio of rate of oxygen transfer to the liquid to the liquid flow rate substantially constant within a normal working range of liquid flow rates.

2. Liquid aeration apparatus comprising (a) a container having an inlet and an outlet adapted for continuous flow of liquid through the container, (b) rotatable aeration means mounted in the container for varying the oxygne transfer rate to the liquid in accordance with the extent of its immersion in said liquid, (c) means for rotating said aeration means, and (d) a fixed weir at said outlet for controlling the discharge of liquid from said container, said weir having a relatively wide bottom and sides converging towards the upper end of the weir for varying the level of said liquid within the container in accordance with the flow rate of the liquid through said container to maintain the ratio of rate of oxygen transfer to the liquid to the liquid flow rate substantially constant within a normal working range of liquid flow rates.

3. Liquid aeration apparatus comprising (a) a container having an inlet and an outlet adapted for continuous flow of liquid through the container, (b) a rotatable aerator member mounted for rotation in the container for varying the oxygen transfer rate to the liquid in accordance with its immersion in the said liquid, and comprising an inverted frustoconical shell, the member being rotatable about the axis of the shell, and a plurality of arms each of which (i) lies in a plane parallel to the axis of the shell and tangential to a central circular locality of small diameter which is co-axial with the shell, (ii) extends along the lower surface of the shell, (iii) comprises an end portion extending outwardly from the outer periphery of the shell, said end portion having a horizontal upper edge, and (iv) has a horizontal plate generally in the plane of the outer periphery of the shell and extending circumferentially from the upper edge of its arm on the side of said arm remote from the circular locality and outwardly from the outer periphery of the shell; (c) means for rotating the aerator member at substantially constant angular velocity in the direction in which the plates thereof extend circumferentially from said arms, and (d) a fixed weir at said outlet for controlling the discharge of liquid from said container, said weir having a relatively wide bottom and sides converging towards the upper end of the weir for varying the level of said liquid within the container in accordance with the flow rate of liquid through the container to maintain the ratio of rate of oxygen transfer to the liquid to the liquid flow rate substantially constant within a normal working range of liquid flow rates.

4. The liquid aeration apparatus defined in claim 1 wherein said sides of said weir are convexly curved towards each other.

5. Liquid aeration apparatus comprising (a) a container having an inlet and an outlet adapted for continuous flow of liquid through the container, (b) rotatable aeration means mounted in the container for varying the oxygen transfer rate to the liquid in accordance with the extent of its immersion in said liquids, (c) means for rotating the aeration means at substantially constant angular velocity, and (a) a fixed weir at said outlet for controlling the discharge of liquid from said container, said weir having a relatively wide bottom and sides converging towards the upper end of said weir for varying the level of said liquid within the container in accordance with the flow rate of the liquid through said container to maintain the ratio of rate of oxygen transfer to the liquid to the liquid flow rate substantially constant within a normal working range of liquid flow rates.

6. Liquid aeration apparatus comprising (a) a container having an inlet and an outlet adapted for continuous flow of liquid through the container, (b) a rotatable aerator member mounted in the container for varying the oxygen transfer rate in accordance with the extent of its immersion in said liquid and comprising a symmetrical shell coaxial with the aerator member and a plurality of arms extending along a surface of the shell, (c) means for rotating the aerator member, and (d) a fixed weir at said outlet for controlling the discharge of liquid from said container, said weir having a relatively wide bottom and sides converging towards the upper end of the weir for varying the level of said liquid within the container in accordance with the flow rate of the liquid through said container to maintain the ratio of rate of oxygen transfer to the liquid to the liquid flow rate substantially constant within a normal working range of liquid flow rates.

7. Liquid aeration apparatus comprising (a) a container having an inlet and an outlet adapted for continuous flow of liquid through the container, (b) a rotatable aerator member mounted for rotation in the container for varying the oxygen transfer rate in accordance with the extent of its immersion in said liquid and comprising an inverted frusto-conical shell, the member being rotatable about the axis of the shell, and a plurality of arms each of which (i) lies in a plane parallel to the axis of the shell and tangential to a central circular locality of small diameter which is co-axial with the shell, (ii) extends along the lower surface of the shell, and (iii) comprises an end portion extending outwardly from the outer periphery of the shell; (c) means for rotating the aerator member, and (d) a fixed weir at said outlet for controlling the discharge of liquid from said container, said weir having a relatively wide bottom and sides converging towards the upper end of the weir for varying the level of said liquid within the container in accordance with the flow rate of the liquid through said container to maintain the ratio of rate of oxygen transfer to the liquid to the liquid flow rate substantially constant within a normal working range of liquid flow rates.

8. Liquid aeration apparatus comprising (a) a container having an inlet and an outlet adapted for continuous flow of liquid through the container, (b) a rotatable aerator member mounted for rotation in the container for varying the oxygen transfer rate in accordance with the extent of its immersion in said liquid and comprising an inverted frusto-conical shell, the member being rotatable about the axis of the shell, and a plurality of arms each of which (i) lies in a plane parallel to the axis of the shell and tangential to a central circular locality of small diameter which is co-axial with the shell, (ii) extends along the lower surface of the shell, (iii) comprises an end portion extending outwardly from the outer periphery of the shell, said end portion having a horizontal upper edge, and (iv) has a horizontal plate generally in the plane of the outer periphery of the shell and extending circumferentially from the upper edge of its arm on the side of said arm remote from the circular locality and outwardly from the outer periphery of the shell; (c) means for rotating the aerator member, and (d) a fixed weir at said outlet for controlling the discharge of liquid from said container, said weir having a relatively wide bottom and sides converging towards the upper end of the weir for varying the level of said liquid within the container in accordance with the flow rate of the liquid through said container to maintain the ratio of rate of oxygen transfer to the liquid to the liquid flow rate substantially constant within a normal working range of liquid flow rates.

9. Liquid aeration apparatus comprising (a) a container having an inlet and an outlet adapted for continuous flow of liquid through the container, (b) a rotatable arerator member mounted for rotation in the container for varying the oxygen transfer rate in accordance with the extent of its immersion in said liquid and comprising an inverted frusto-conical shell, the member being rotatable about the axis of the shell, a circular cylindrical projection extending downwardly from the shell coaxially therewith, and a plurality of arms each of which (i) lies in a plane parallel to the axis of the shell and tangential to the projection, (ii) extends along the lower surface of the shell, (iii) comprises an end portion extending outwardly from the outer periphery of the shell, said end portion having a horizontal upper edge, and (iv) has a horizontal plate generally in the plane of the outer periphery of the shell and extending circumferentially from the upper edge of its arm on the side of said arm remote from the circular projection and outwardly from the outer periphery of the shell; (c) means for rotating the aerator member, and a fixed weir at said outlet for controlling the discharge of liquid from said container, said weir having a relatively wide bottom and sides converging towards the upper end of the weir for varying the level of said liquid within the container in accordance with the flow rate of the liquid through said container to maintain the ratio of rate of oxygen transfer to the liquid to the liquid flow rate substantially constant within a normal working range of liquid flow rates.

References Cited

UNITED STATES PATENTS

| | | | |
|---|---|---|---|
| 1,067,491 | 7/1913 | Abady | 73—215 |
| 1,772,518 | 8/1930 | Pardini | 73—215 |
| 2,100,219 | 11/1937 | Kennison | 73—215 |
| 2,421,191 | 5/1947 | Durdin | 259—97 |
| 3,182,972 | 5/1965 | Alsop | 259—107 |

WALTER A. SCHEEL, *Primary Examiner.*

R. W. JENKINS, *Assistant Examiner.*